E. G. EAGAN.
FEED TROUGH.
APPLICATION FILED JAN. 4, 1911.
1,060,326.
Patented Apr. 29, 1913.
2 SHEETS—SHEET 1.
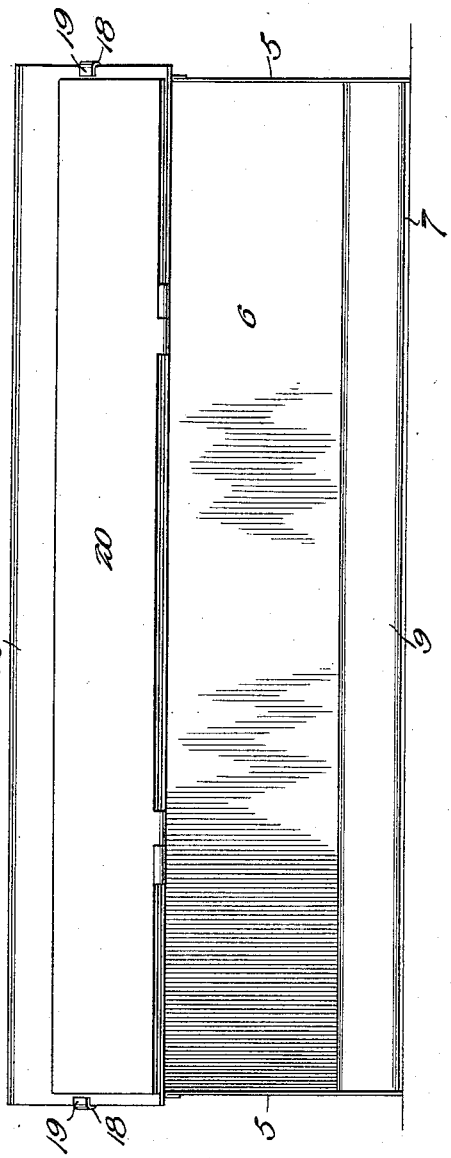
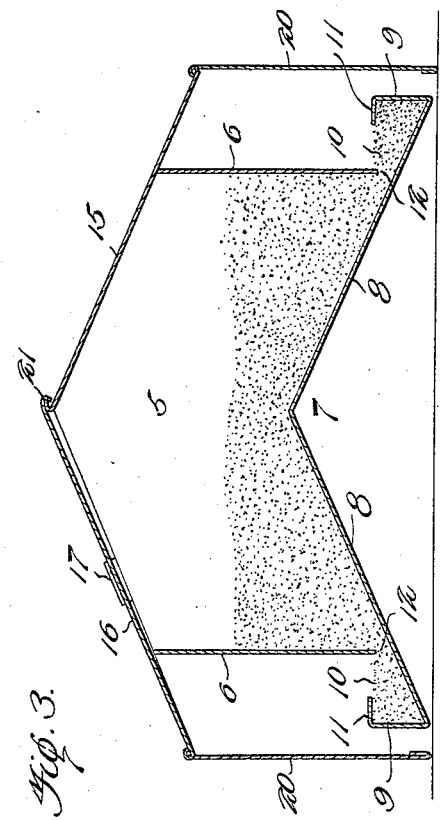
Witnesses
Inventor
Elwood G. Eagan
By Victor J. Evans
Attorney

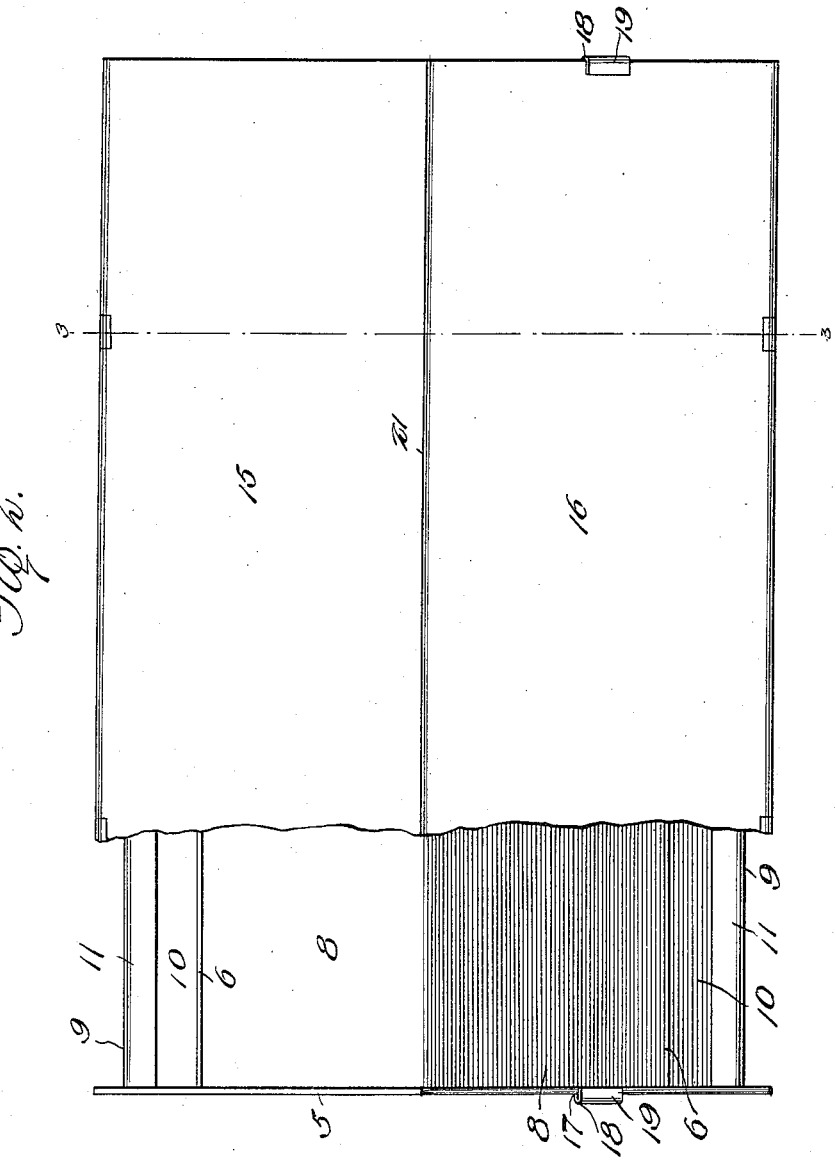

UNITED STATES PATENT OFFICE.

ELWOOD G. EAGAN, OF BROCKTON, MASSACHUSETTS.

FEED-TROUGH.

1,060,326.

Specification of Letters Patent. Patented Apr. 29, 1913.

Application filed January 4, 1911. Serial No. 600,753.

*To all whom it may concern:*

Be it known that I, ELWOOD G. EAGAN, a citizen of the United States, residing at Brockton, in the county of Plymouth and State of Massachusetts, have invented new and useful Improvements in Feed-Troughs, of which the following is a specification.

The invention relates to poultry feeders, and more particularly to the class of poultry feed troughs.

The primary object of the invention is the provision of a trough in which feed may be automatically delivered for the feeding of the poultry, without possibility of the said feed being wasted from the trough.

Another object of the invention is the provision of a trough in which the feed will be protected from both rain or snow, and also from mice or rats gaining access to the said trough, although permitting the poultry to obtain the requisite feed at predetermined intervals, thus obviating the possibility of the overfeeding of such poultry.

A further object of the invention is the provision of a trough of this character in which the feed therein will be automatically delivered for access by the poultry, but such feed will be prevented from being scattered by the poultry when in the act of feeding, the feed being readily and easily introduced into the trough, and also the latter may be readily and easily cleaned, thereby preserving sanitary conditions for the same.

A further object of the invention is the provision of a trough of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a front elevation of a trough constructed in accordance with the invention, one of the covers thereof being elevated, whereby access may be had to the trough by the poultry. Fig. 2 is a top plan view thereof. Fig. 3 is a sectional view on the line 3—3 of Fig. 2.

Similar reference characters indicate corresponding parts throughout the several views of the drawings.

Referring to the drawings by numerals, the trough comprises a body, including vertical end and side walls 5 and 6, respectively, the said side walls being connected with the end walls spaced from their outer side edges, and a bottom 7, the same being bent medially throughout its length to form reversely sloping surfaces 8, the said bottom being extended beyond the side walls 5 and has its outer longitudinal edges upturned, as at 9, thereby forming troughs 10 outside of the side walls 5 of the body. The upturned portions 9 are provided with inbent ledges 11 serving as guards to the troughs 10 to prevent the feed therein from being scattered by the poultry when eating from the troughs, thus obviating the waste of the feed. The lower edges of the side walls 6 are spaced from the sloping surfaces 8 of the bottom 7, so as to provide open spaces 12, which extend the entire length of the body and permit the feed therein to escape in small quantities into the troughs 10, so that the poultry may gain access to the feed.

Secured to the body and covering onehalf of the same is a rearwardly sloping stationary roof section or lid 15, while covering the other half of the body is a removable roof section or lid 16, the same being forwardly inclined and is slidably engaged in clips 17, each being formed from a single strip suitably secured to the end wall and having an outbent bearing extension 18, from which rises an inturned gripping flange 19, the latter engaging and overlapping the edge of the removable roof section or lid 16, the outer longitudinal edges of the lids or roof sections 15 and 16 being extended a considerable distance over the troughs 10, so as to protect the same from rain or snow when falling upon the roof sections.

Hinged in any suitable manner to the longitudinal edges of the roof sections 15 and 16 are drop doors 20, which, when in lowered position, prevent access being had to the troughs 10 by the poultry, and also protect the feed contained therein from rats or mice. However, when it is desired to feed the poultry, these doors are swung upwardly and rearwardly upon the roof sections, thereby permitting access to be had to the troughs for the feeding of the poultry.

The body is preferably constructed from sheet metal, although it may be constructed from any other suitable material. It is obvious that on the removal of the roof section 16, feed may be introduced into the body, whereby it may gravitate into the troughs 10, from which the poultry may feed.

The contiguous inner edges of the roof sections 15 and 16 are provided with interlocking seams 21, so that when the sections are in position for closing the body of the device, these seams will overlap each other and thereby prevent water from leaking into the said body which would result in damage to the feed held within the body of the device.

From the foregoing, it is thought that the construction and operation of the invention will be readily understood, without requiring a more extended explanation, and therefore the same has been omitted.

What is claimed is:

A feed trough comprising a body having vertical end walls provided with reversely sloping upper edges, side walls fixed to the end walls, a bottom fixed to the end walls, a stationary roof section fixed to the sloping edges of the end walls of the body for covering one-half of the same, the upper edge of the stationary section being bent upon itself to provide a locking flange, guide clips on the remaining sloping edges of the other half of the end walls, a roof section slidable in the said guide clips and having its upper edge bent downwardly for engagement with the locking flange of the stationary section to limit the downward movement of said sliding roof section, the said bottom being bent medially of its length to present reversely sloping surfaces extending below and beyond the side walls, the free longitudinal edges of the bottom being upturned to form troughs exteriorly of the side walls, and plates hinged to the outer longitudinal edges of the roof sections and normally depending from the latter and spaced from the troughs.

In testimony whereof I affix my signature in presence of two witnesses.

ELWOOD G. EAGAN.

Witnesses:
 JAMES W. EAGAN,
 JESSE MITCHELL.

Copies of this patent may be obtained for five cents each, by addressing the "Commissioner of Patents, Washington, D. C."